(12) United States Patent
Parker et al.

(10) Patent No.: US 7,813,898 B2
(45) Date of Patent: Oct. 12, 2010

(54) PROCESSING SENSING MEASUREMENTS

(75) Inventors: Tom Richard Parker, London (GB);
Kin-Wei Lee, London (GB)

(73) Assignee: Sensornet Limited, Elstree (GB)

(*) Notice: Subject to any disclaimer, the term of this patent is extended or adjusted under 35 U.S.C. 154(b) by 539 days.

(21) Appl. No.: 11/572,827

(22) PCT Filed: Jul. 22, 2005

(86) PCT No.: PCT/GB2005/050115

§ 371 (c)(1),
(2), (4) Date: Jan. 29, 2007

(87) PCT Pub. No.: WO2006/010959

PCT Pub. Date: Feb. 2, 2006

(65) Prior Publication Data

US 2008/0065344 A1  Mar. 13, 2008

(30) Foreign Application Priority Data

Jul. 29, 2004  (GB) ................................. 0416878.7

(51) Int. Cl.
*G06F 19/00* (2006.01)
*G06F 17/40* (2006.01)
*G01V 9/00* (2006.01)

(52) U.S. Cl. ........................................ 702/187; 702/189

(58) Field of Classification Search ................. 340/500, 340/540, 577, 584, 600, 665, 670, 686.1, 340/815.4, 815.65, 853.1, 854.1, 870.01, 340/871.07; 345/418, 440, 440.1, 440.2, 345/619, 660; 702/1, 33, 34, 35, 127, 130, 702/137, 138, 155, 157, 166, 170, 187, 188, 702/189; 715/867
See application file for complete search history.

(56) References Cited

U.S. PATENT DOCUMENTS

| | | | | |
|---|---|---|---|---|
| 2,415,364 A | * | 2/1947 | Mounce | ........................ 324/366 |
| 2,524,360 A | * | 10/1950 | Russell | ........................ 324/346 |
| 3,396,788 A | * | 8/1968 | Bell | ........................ 166/255.1 |
| 3,406,387 A | * | 10/1968 | Werme | ................... 340/870.15 |
| 3,895,520 A | | 7/1975 | Fertl et al. | |
| 4,352,166 A | | 9/1982 | Scoonover et al. | |
| 4,495,488 A | * | 1/1985 | Streib | .......................... 340/606 |
| 5,089,989 A | | 2/1992 | Schmidt et al. | |

(Continued)

FOREIGN PATENT DOCUMENTS

WO  WO02/057805  7/2002

OTHER PUBLICATIONS

Simultaneous Distributed Measurement of strain and Temperature from Noise-Initiated Brillouin Scattering in Optical Fiber; Parker et al., IEEE Journal of Quantum Electronics, vol. 34, No. 4, Apr. 1998, pp. 645-659.

*Primary Examiner*—Edward R Cosimano
(74) *Attorney, Agent, or Firm*—Barkume & Associates, P.C.

(57) ABSTRACT

Software (140) for processing measurements from a distributed sensing system (100) receives the measurements, and generates a graphical representation of the measurements indicating their location or time sequence, and a representation of locations of physical features along the path (50), or times of external events, the representations being scaled and associated to provide a visual correlation between the locations of the measurements and locations of the physical features, or between times of measurements and times of external events. The enhanced visual correlation can lead to cost savings if more rapid interpretation of large volumes of measurements can give warning of changes such as subsidence of structures, or of ingress of water into oil wells, for example in time for remedial action to be taken.

17 Claims, 9 Drawing Sheets

U.S. PATENT DOCUMENTS

| | | | |
|---|---|---|---|
| 5,163,321 A * | 11/1992 | Perales | 73/152.52 |
| 5,777,598 A * | 7/1998 | Gowda et al. | 345/440 |
| 5,800,748 A * | 9/1998 | Kamiguchi et al. | 264/40.1 |
| 5,830,150 A * | 11/1998 | Palmer et al. | 600/523 |
| 6,041,017 A * | 3/2000 | Goldsberry | 367/38 |
| 6,064,428 A * | 5/2000 | Trosino et al. | 348/128 |
| 6,356,299 B1 * | 3/2002 | Trosino et al. | 348/128 |
| 6,530,263 B1 | 3/2003 | Chana | |
| 6,553,419 B1 * | 4/2003 | Ram | 709/224 |
| 6,609,085 B1 * | 8/2003 | Uemura et al. | 702/189 |
| 6,760,665 B1 * | 7/2004 | Francis | 702/6 |
| 6,800,059 B2 * | 10/2004 | Muraki et al. | 600/300 |
| 7,181,365 B2 * | 2/2007 | Inoue et al. | 702/183 |
| 7,302,373 B2 * | 11/2007 | Fleury et al. | 703/10 |
| 7,364,548 B2 * | 4/2008 | Shirasaki et al. | 600/485 |
| 2002/0077787 A1 | 6/2002 | Rappaport et al. | |
| 2004/0138818 A1 | 7/2004 | Shray et al. | |
| 2004/0189637 A1 * | 9/2004 | Abriol et al. | 345/440 |
| 2004/0204855 A1 * | 10/2004 | Fleury et al. | 702/6 |
| 2005/0171442 A1 * | 8/2005 | Shirasaki et al. | 600/485 |
| 2005/0209820 A1 * | 9/2005 | Inoue et al. | 702/183 |
| 2006/0020205 A1 * | 1/2006 | Kamiyama | 600/437 |
| 2006/0044326 A1 * | 3/2006 | Hiyoshi et al. | 345/619 |
| 2006/0047210 A1 * | 3/2006 | Moroki et al. | 600/509 |
| 2006/0100536 A1 * | 5/2006 | Nagai et al. | 600/519 |
| 2007/0033074 A1 * | 2/2007 | Nitzan et al. | 705/3 |
| 2007/0129912 A1 * | 6/2007 | Inoue et al. | 702/183 |
| 2008/0009737 A1 * | 1/2008 | Takimoto et al. | 600/454 |
| 2008/0071580 A1 * | 3/2008 | Marcus et al. | 705/3 |
| 2008/0097175 A1 * | 4/2008 | Boyce et al. | 600/323 |
| 2008/0103715 A1 * | 5/2008 | Tsuda et al. | 702/81 |
| 2008/0170073 A1 * | 7/2008 | Ono et al. | 345/440.1 |
| 2008/0269606 A1 * | 10/2008 | Matsumura | 600/438 |
| 2008/0273036 A1 * | 11/2008 | Kishimoto et al. | 345/440 |

* cited by examiner

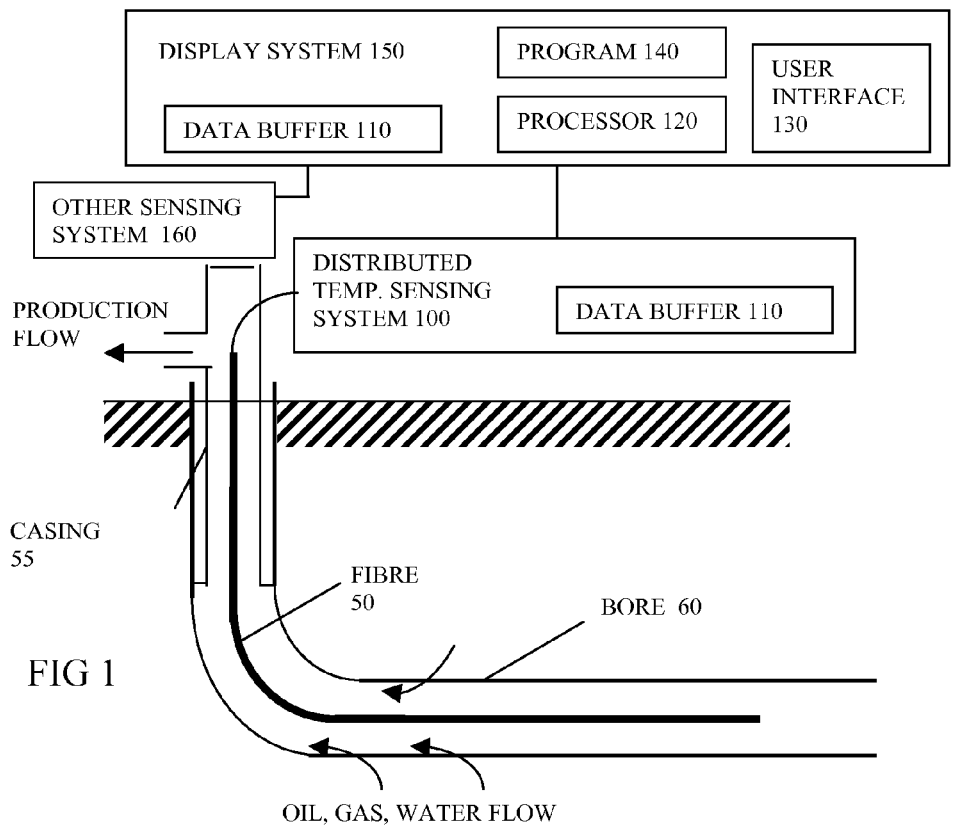
FIG 1
FIG 2
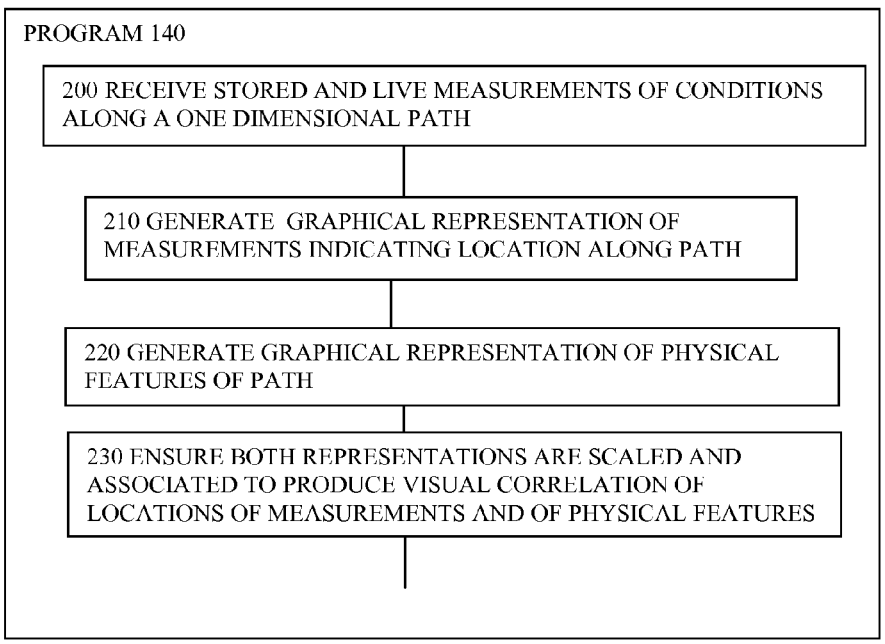

PROCESSING SENSING MEASUREMENTS

FIELD OF THE INVENTION

The present invention relates to software for processing of measurements of conditions along a one dimensional path such as a borehole, to computers having such software, to sensing systems for sensing the conditions and processing the measurements, and to methods of analysing such measurements.

BACKGROUND

There is a requirement in industry for the measurement of conditions such as strain or temperature at all points over long distances. Typical uses are for monitoring oil and gas wells, long cables and pipelines. The measurements can be displayed or analysed and used to infer the condition of the structures. Distributed temperature sensors (DTS) often use Raman or Brillouin components of scattered light in optical fibres as the means to determine the temperature. Here, light from an optical source is launched into a fibre and the small amount of light that is scattered back towards the source is analysed. By using pulsed light and measuring the returning signal as a function of time, the backscattered light can be correlated to distance along the fibre. This backscattered light contains a component which is elastically scattered (Rayleigh light) and components that are up- and down-shifted in frequency from the source light (Raman and Brillouin anti-Stokes and Stokes light respectively, also known as inelastic scattered light). The powers of the returning Raman components are temperature dependent and so analysis of these components yields the temperature. The powers and frequency of the returning Brillouin components are strain and temperature dependent and so analysis of both components can yield temperature and strain independently.

Such systems have been known for many years. It is also known from "Simultaneous distributed measurement of strain and temperature from noise-initiated Brillouin scattering in optical fibers" by Parker, T. R.; Farhadiroushan, M.; Feced, R.; Handerek, V. A.; Rogers, A. J.; Quantum Electronics, IEEE Journal of, Volume: 34 Issue: 4, April 1998 Page(s): 645-659 to display temperature vs time or distance. The measurements from such systems can be displayed in a windows display environment in the form of a two dimensional graph of temperature versus distance along the bore.

This can be updated periodically, every minute perhaps, and the display can be zoomed to show variations over a small distance. To see variations over time, a single point along the bore can be selected and a two dimensional view of temperature versus time can be viewed in a separate window.

It is also known from U.S. Pat. No. 6,760,665 to provide a graphical user interface (GUI) for a well logging display program for displaying and editing data records included in well logging data. The GUI includes multiple windows and controls for user interaction. The well logging data includes measurements of logging variables collected at successive depths to define the data records. The multiple windows include a first window for displaying depth versus time measurements, a second window for defining a logging variable, a third window for selecting and displaying a first set of instances of the logging variable, and a fourth window for selecting and displaying a second set of instances of the logging variable. The logging variable can be selected from a pull down menu providing options including neutron porosity (NPHI), natural gamma ray, and temperature measurements. This uses data acquired by a sensor-equipped down hole logging tool and categorized as either "real-time" or "recorded mode data." The term "real-time" data, as used herein, includes data acquired while the logging tool is in the well and transmitted to the surface and recorded shortly after being acquired. The "recorded mode," data is acquired and stored in a memory device of the logging tool and subsequently retrieved from the memory when the logging tool is brought to the surface.

It is also known that a spreadsheet program such as Microsoft Excel™ can be loaded with well logging data and graphs of temperature variation with time or distance can be displayed or printed. This has been known for many years and enables a user who is experienced to deduce where changes in conditions can be correlated to known physical features at the same location. However this is time consuming and where the measurements can include important changes over short regions, perhaps a few meters, of a long pipe, perhaps many kilometers long, and new readings are obtained every few minutes, then many such changes may be missed and opportunities to take remedial or pre-emptive action may be missed, with costly results.

SUMMARY OF THE INVENTION

It is an object of the present invention to provide improved apparatus and methods. According to a first aspect of the invention, there is provided: Software for causing a computer to process measurements from a distributed sensing system for sensing conditions at any range of locations along a one dimensional path, the software being arranged to receive the measurements, and generate a graphical representation of the measurements indicating their location, and a representation of locations of physical features along the path, both representations being scaled and associated to provide a visual correlation between the locations of the measurements and locations of the physical features.

By having representations scaled and associated, to enhance such visual correlation, a user can interpret the measurements more quickly to draw inferences such as causes of changes in the measurements. This can increase understanding of conditions and what is happening around the path being monitored. Particularly where the volume of data is large, or the data is time sensitive, it can be crucial to interpret such data more quickly. Considerable cost savings can be achieved if the conditions give warning of changes such as subsidence of structures, or of ingress of water into oil wells, for example in time for remedial action to be taken. Also the correlation can be used to increase confidence in the measurements, or test the accuracy of the sensing system. The path may be one dimensional but can weave around a two dimensional structure or around two or three dimensions of a three dimensional structure, or be looped backwards and forwards along both directions of a pipe for example. The scaling and association can encompass horizontal or vertical alignment of representations, or colour coding or lead lines to corresponding parts or other visual effects to provide the visual correlation.

An additional feature for a dependent claim, is a scale of the representation of distance along the path being user selectable.

This is particularly useful for viewing changes over a small length of a long structure, such as changes around a physical feature.

Another additional feature for a dependent claim, is the measurements comprising measurements over time for a given location, and the graphical representation showing variations with time. This is particularly useful for viewing changes over time especially where many measurements have been taken at different times and timing events are to be identified in the measurement data.

Another additional feature is receiving measurements from a second sensing system, and generating a third representation scaled and aligned with the representation of the physical features. This can encompass multiple additional sensing systems of different types and even sensing systems for different paths or different installations, if useful information can be deduced. This is particularly useful for viewing changes in multiple sets of measurement data where inferences are made by comparing more than one measured parameter.

An additional feature is the visual correlation being provided by overlaying the representations. This can give a particularly direct and strong correlation, though other ways may avoid obscuring information.

Another additional feature is the visual correlation being provided by having the representations offset such that axes representing distance along the path for each representation are parallel.

This is particularly useful in providing strong correlation while reducing the risk of obscuring information.

The conditions can comprise temperature or strain notably. The other sensing system can be a point sensing system such as a fixed temperature, pressure or flow rate sensor for example.

Another additional feature is a preliminary step of calibrating the locations of the measurements using a reference measurement at a reference location. This is particularly useful to adjust the measurements closer to their actual physical locations.

Another additional feature is generating at least a third representation of measurements of a different parameter, scaled and aligned to the first two representations. This is useful to enable more complex visual correlations and can encompass measurements from different sensing systems, different parameters from the same sensing system, or derived measurements such as mathematical combinations of measurements for example. This is useful to generate additional quantative interpretations from the measurement data.

Another additional feature is generating graphical symbols for the physical features which are reproportioned as the distance scale is altered. This can help avoid such symbols becoming unrecognisable with large amounts of zoom in the distance dimension.

Another additional feature is generating a representation in a time axis of external events affecting the path, scaled and aligned with the representation of the measurements over time. This is useful to show notable changes and to enable correlation with changes to other parameters or with external events.

Another additional feature is generating a representation of a region of interest in the measurements. This can enable a user to focus on one region while retaining a wider view showing where the region is in relation to the entire path for example.

Another additional feature is the region being marked on the representation of the location of the physical features. This can make it easier to identify or rule out quickly if the region of interest is related to the physical features.

Another additional feature is the representation of the measurements comprising a three or more dimensional view of the conditions vs time and location. This can be advantageous in showing more information at once, but other views with fewer dimensions may be easier to use for seeing measurement values, and obtaining the visual correlation with location of the physical features.

Another additional feature is generating a graphical representation of a trajectory of the path.

Another aspect of the invention provides software for causing a computer to process measurements from a distributed sensing system for sensing conditions at any range of locations along a one dimensional path, the processing comprising receiving the measurements, and generating a graphical representation of a time series of the measurements, and a representation of external events at given locations along the path, both representations being scaled and associated to provide a visual correlation between the timing of the measurements and the external events. This can provide corresponding advantages, the enhanced correlation leading to more rapid interpretation of large volumes of measurements, and to useful deductions which can lead to cost savings in operating installations in the area being monitored.

Other aspects of the invention include a method of using the software, and a computer comprising an interface to one or more sensing systems and software as set out above, and a user interface for presenting the representations to the user, and for receiving user input.

A system comprising a distributed sensing system for sensing conditions remotely at substantially all locations along a one dimensional path, and further comprising the computer set out above.

Another aspect provides a method of analysing measurements from a distributed sensing system for sensing conditions at substantially all locations along a one dimensional path, comprising the steps of selecting a subset of the measurements, causing generation of a graphical representation of the location of the selected measurements along the path with a representation of physical features of the path, scaled and mutually aligned to provide a visual correlation, zooming the representations and panning along the path to identify regions of interest using the visual correlation of the measurements and the physical features, selecting a region of interest, and causing generation of a graphical representation of the measurements at different times for the region of interest.

This is intended to cover amongst others, some of the actions of a user of the software, in case e.g. the user is in the jurisdiction, but the software is not. This use of the features of the software can help speed up analysis of the measurements, and enable more efficient monitoring, so that expert users can review much more of the large volumes of measurements produced.

An additional feature is the step of selecting measurements from a second sensing system, and causing generation of a third representation scaled and aligned with the representation of the physical features.

An advantage of showing conditions varying over time for a sequence of points is that a user can see notable changes without having to scan manually from point to point, or without the delay of having to view many points sequentially. An advantage of mapping distributed measurements and structural features is to enable easier selection by a user of regions of interest and easier interpretation of the measurements. Useful views of the measurements include plots of variation with distance and with time.

In other words, to map the data with a schematic or a picture of the structure that is instrumented with sensing systems, is useful in particular for distributed data. The data and the graphical representation of the structure are scalable and correlated according to the coordinates where the data is displayed. This helps exploit the advantages of distributed sensing over sensing at discrete points. Such distributed sensing can build a better database of the conditions than sensing at discrete points, but until now it has been hard to access that database to highlight anomalous conditions to users in a simple to use display. This is enabled by the features set out above, notably including mapping the distributed data in a scaleable format with a resolution of 1 m or less along the path.

Other advantages will be apparent to those skilled in the art, especially in relation to other prior art not known to the inventors. Any of the additional features can be combined together and combined with any of the aspects, as would be apparent to those skilled in the art.

BRIEF DESCRIPTION OF THE DRAWINGS

Embodiments of the invention and how to put it into practice are described by way of example with reference to the accompanying drawings in which:

FIG. 1 shows a system including a distributed sensing system for a borehole and a display system having a program for processing the measurements according to an embodiment, FIGS. 2 and 3 show features of the program according to embodiments, FIGS. 4 to 8 each show a screen view produced by a program according to an embodiment.

DETAILED DESCRIPTION

FIG. 1 System

Figure 3:
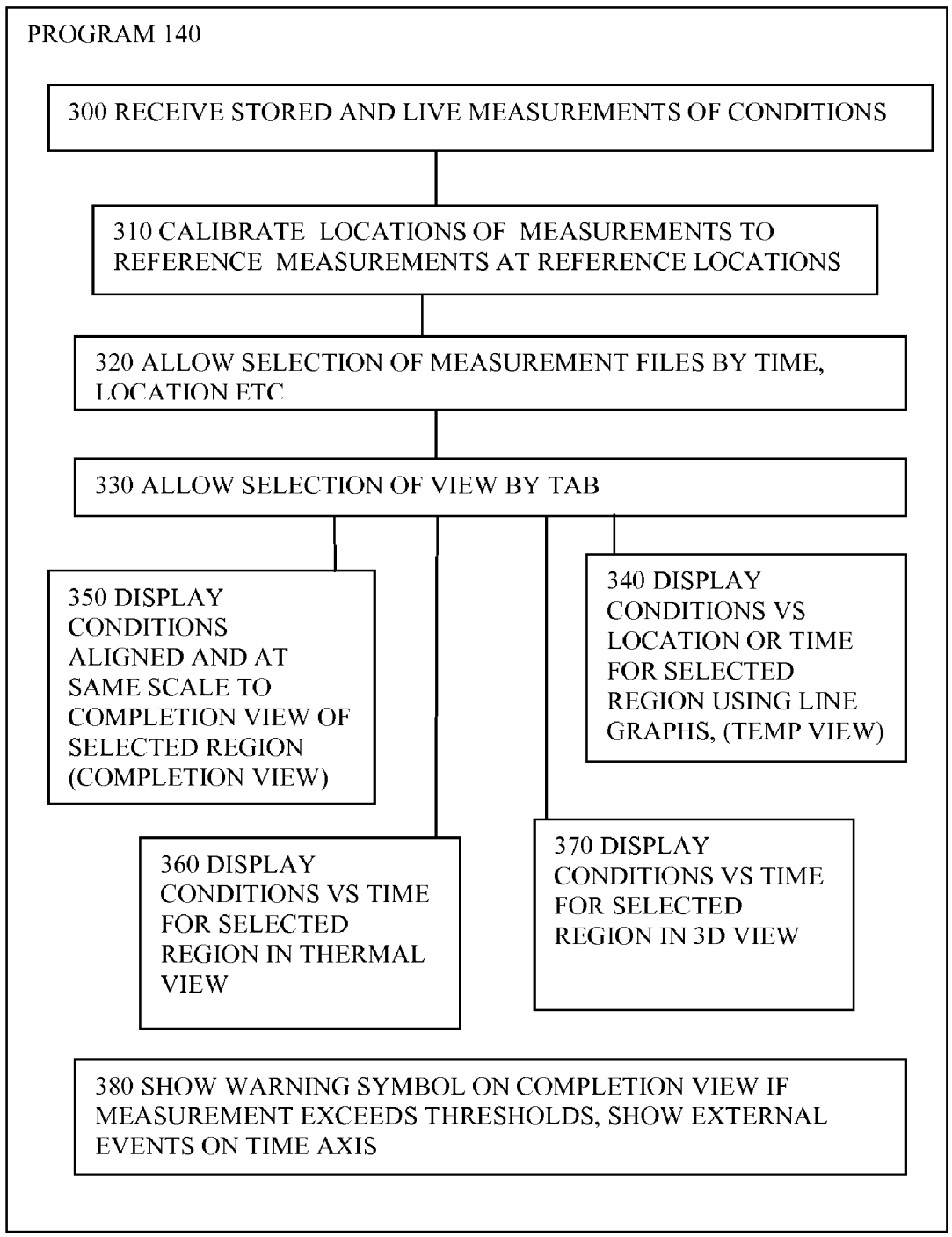

The program is a tool for displaying in a user friendly format data obtained from a path in the form of a bore well for example. The data can contain measurements of the conditions in the form of temperature and strain measurements for example, though other measurements are possible. FIG. 1 shows how it can be applied in the context of a display system coupled to a distributed sensing system for a borehole. It shows a sensing fibre 50 installed in a wellbore. The fibre is protected from damage in any suitable manner and is coupled to a distributed sensing system 100 at the wellhead on the surface (or seabed, or sea surface). This optionally has a data buffer 110 for storing the measurements. The bore 60 is typically large enough to take a 10 inch steel casing 55 for a vertical part which can extend anything from hundreds to thousands of meters. The bore typically narrows to a 5 inch bore, 60 and is curved very gradually to extend horizontally for anything up to several thousand meters. Typically there are many boreholes serviced from a single wellhead location, each extending in different horizontal directions to cover a large area of the oil or gas field. At the wellhead, the production flow is typically fed away to one side through valves, and a removable cap suitable to resist high pressures is placed on the top, to enable vertical access into the wellbore for drilling tools or conventional intervention methods for example. The sensing system can be arranged to determine strain and temperature at different points along the fibre. The strain can be useful in correcting temperature measurements, or for determining bending, compaction or stretching of the wellbore casing. The measurements can be made using established measurement principles which need not be described here in detail.

The display system 150 is coupled to the sensing system by a data path. The display system can be at the same location or integrated with the sensing system which generates the measurements. Or the display system can be at a different location remote from the sensing system. The display system comprises a user interface 130, driven by a processor 120, running a program 140, and can have its own data buffer 110 for storing measurements from the sensing system. The display system can be based on conventional personal computer technology running a windows™-based operating system or on other hardware and software as desired. The user interface can include conventional input means such as a keyboard and mouse. The graphical representations can be output to a display, or a printer for example, or transmitted elsewhere for analysis, for example over the internet, or to storage for later analysis. The display system can be coupled to one or more other sensing systems 160 or to buffers holding measurements from such other systems. These could include for example systems for sensing gamma radiation, pressure, flow rate, conductivity, or sonar systems. The sensors could be point sensors at fixed locations or dragged or floated along the path for example.

FIGS. 2,3, Program

FIGS. 2 and 3 show some principal steps of embodiments of the program. In FIG. 2, at step 200, the program receives stored, buffered and/or live real time measurements of conditions along a one dimensional path. If averaging of readings is carried out to reduce noise, it may take many minutes of readings to obtain one set of measurements, so the update rate of real time readings may be many minutes. The measurements can be in the form of an array of numerical digital data, such as a first column of elements indicating a distance from a datum, and a second column containing measurement values at each distance. A third and successive columns could contain values for the corresponding locations at different times, or a noise value, or a value of a different measurement parameter. A typical measurement parameter for a borehole is temperature, since much information can be deduced from temperature, as is well known. In other applications other measurement parameters may be more useful, such as stress or strain measurements for buildings, bridges or dams.

At step 210, the program generates a graphical representation of the measurements indicating a location along the path. At step 220, before or after step 210, a graphical representation of physical features of the path is generated. At step 230, both representations are scaled and associated to produce a visual correlation of locations of the measurements and of physical features. This shows some of the principal features for enabling faster and more efficient monitoring of large volumes of measurements from such paths. This can lead to notable cost savings if the conditions give warning of changes such as subsidence of structures, or of ingress of water into oil wells, for example in time for remedial action to be taken.

FIG. 3 shows another embodiment with a number of additional features. Step 300 includes receiving the measurements, and at step 310, the locations of the measurements are calibrated to reference measurements at reference locations. This is particularly useful where the sensing system is distributed and relies on timing to determine locations of measurements. An optical sensing system such as those described above is an example, though others are possible. These can give good relative accuracy of location measurements, but it is useful to have a reference to enable more accuracy in absolute terms, to take account of errors introduced by stretching of the fibre over long distances or timing errors. One way to achieve this is to identify reference locations where there is an identifiable change in condition such as temperature, at an identifiable location. Examples include the end of a casing in a bore hole, which will be at a known depth, or the start or end of a perforated length of bore, or a change in strata, where oil at a different temperature will be expected to enter the bore. Another example is the far end of the fibre or where the fibre returns along the bore, in these cases, a mirror image of the conditions should be detected. This calibration can increase the confidence of the location measurements to make a significant difference in identifying exactly where a fault is for example, especially where there is no other way such as visual inspection, to confirm the location of a fault. This can be critical in determining exactly where to apply a patch to reline a bore for example.

At step 320 the program allows selection of which measurements to analyse, this can include real time measurements and older measurements for comparison. It can allow selection of measurements from different locations, different bores for example, or different channels in the same bore to enable multiple measurements to be compared of the same or of different parameters. The program can allow a first selection of which files to load, then a further selection of which files to process for display. At step 330, it allows selection from a number of possible views. There are four main views available in this embodiment of the program, selectable by a user clicking on a tab typically at the top of the display. Examples of these four views are represented by steps 340 to 370 and are shown in FIGS. 4 to 8. Step 340 (and FIG. 4) is a temperature (Temp) view, showing conditions such as temperature vs location or vs time in the form of a line graph or graphs. Step 350 (and FIG. 5) is a completion view according to an embodiment of the invention. The term completion is used to refer to physical features including features of how a borehole is completed after drilling, with fixed features such as pumps, valves, linings and so on. The term "physical features" encompasses more, including in this case geological features around the bore (determined from cores for example). For structures, the physical features can encompass structural features such as joints, load bearing points and so on.

This view shows conditions and physical features of the path with visual correlation between the locations of the measurements and the physical features, and may also or alternatively show visual correlation of time of measurements and time of external events which might affect the conditions. Step 360 (and FIG. 6) shows a view (Thermal view) of conditions vs time for a selected range of locations. Variations in temperature are shown by shading or colouring for example. Although not illustrated, it is useful also in this view to have the representation of the physical features overlaid or alongside, to provide the visual correlation. Step 370 (and FIG. 7) shows a three dimensional (3D) view of conditions such as temperature varying with location and time. This provides similar information to the thermal view, but some features may stand out more in a 3 D view. Again although not illustrated, it is useful also in this view to have the representation of the physical features overlaid or alongside, to provide the visual correlation. The measurements can be shown as absolute values or as differences compared to the values for the same locations at a reference time. This can help to highlight changes over time that are otherwise masked by larger changes over distance.

Step 380 has the program showing warning symbol on the completion view if measurement values or rates exceed thresholds. They can also be shown on a trajectory view explained below. Also where time variations are shown, the program can show external events on the time axis, to enable easier visual correlation of time of measurements with time of these events.

FIG. 4 Temp View

Common to FIGS. 4 to 8 are graph manipulation buttons. A group of three icons a cross, magnifying glass and a hand represent cursor manipulation, zooming in and out, and a panning tool. A second set of icons describing distance, temperature or time control aspects of the x or y axes. Finally a third set of icons describing cursors allows the user to control the location and behaviour of the cursors.

In the bottom left hand corner of the FIGS are buttons enabling the user to change the sampling resolution of the data, select whether or not to animate the temperature displays and set the speed of the animation.

Figure 4:
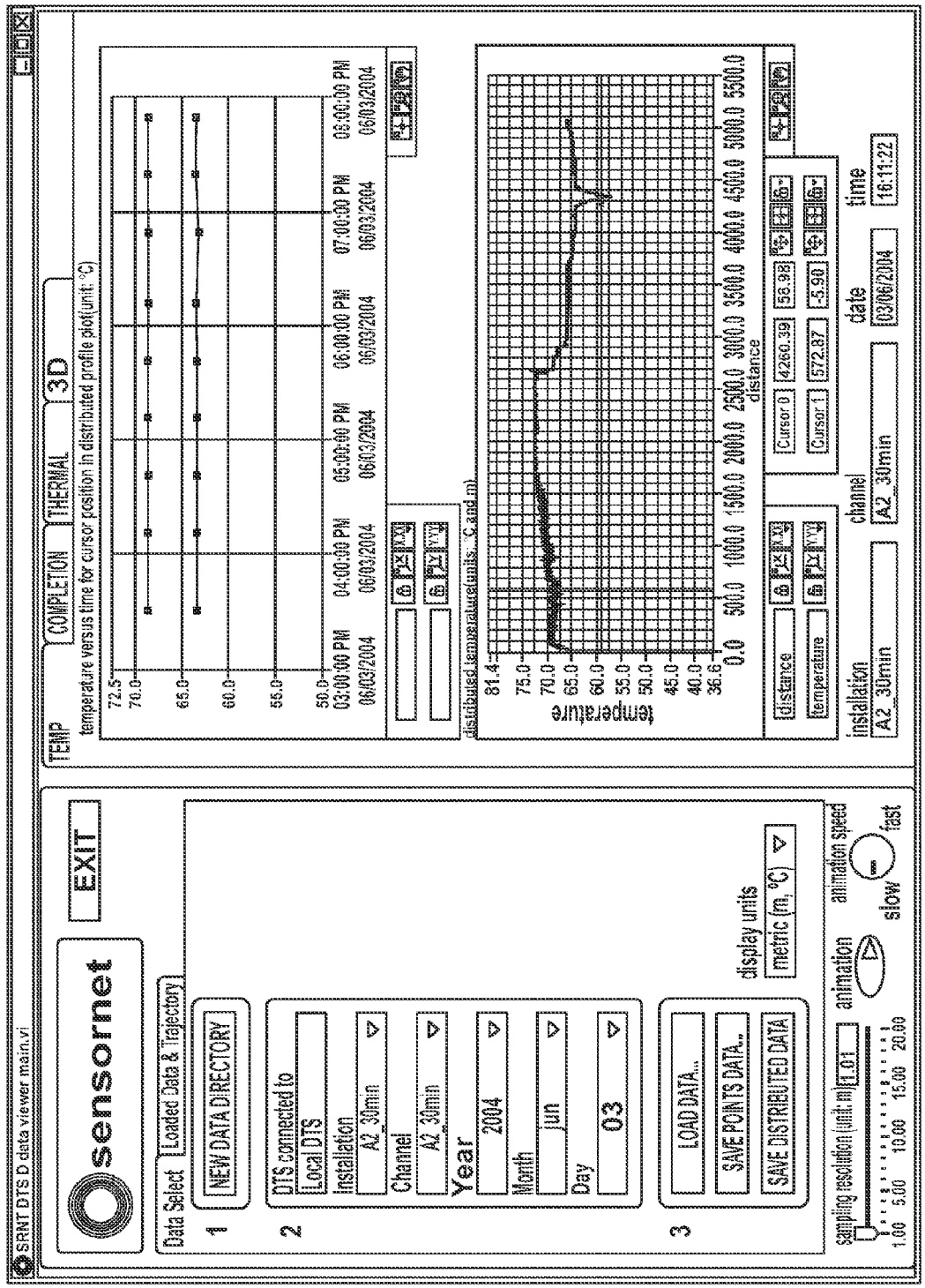

FIG. 4 shows an initial view which uses established practice rather than showing the features of the invention. This and the other views have been created using Labview™ and reference is made to documentation of this well known software tool for further details of implementation. There are two graphs displayed in this tab. The upper graph shows the temperature with respect to time at the two cursors indicated in the lower graph. The lower graph shows each temperature trace at each time slice.

Moving the cursors left and right updates the measurements at those points in the upper graph. The time range can be adjusted. Below the two graphs are three fields indicating which data set is being currently displayed in the lower graph.

At the left hand side of the view are two tabs for selection of files for measurement. The first tab is shown in this figure, and the second tab is shown in more detail in FIG. 5. A button labelled 1 enables selection of directories holding the files, which may include stored or live measurements. Buttons labelled 2 enable selection of measurements by selecting sensing system, installation (e.g. which borehole), channel (e.g. wavelength or parameter within a borehole) and time by year, month, and day for example. Buttons labelled 3 enable loading of data and saving of points data or distributed data. Further buttons at the bottom left of the view enable a user to control sampling resolution, animation on or off, (which shows a series of graphs representing different times, one after another in a time sequence), and control animation speed. Other buttons in the right hand half of the view can be used for zooming and panning each of the graphs to enable greater detail to be seen in regions of interest. Of course many other options could be implemented to help visualise the measurements and find and highlight areas of interest rapidly.

FIG. 5 Comp View

Figure 5:
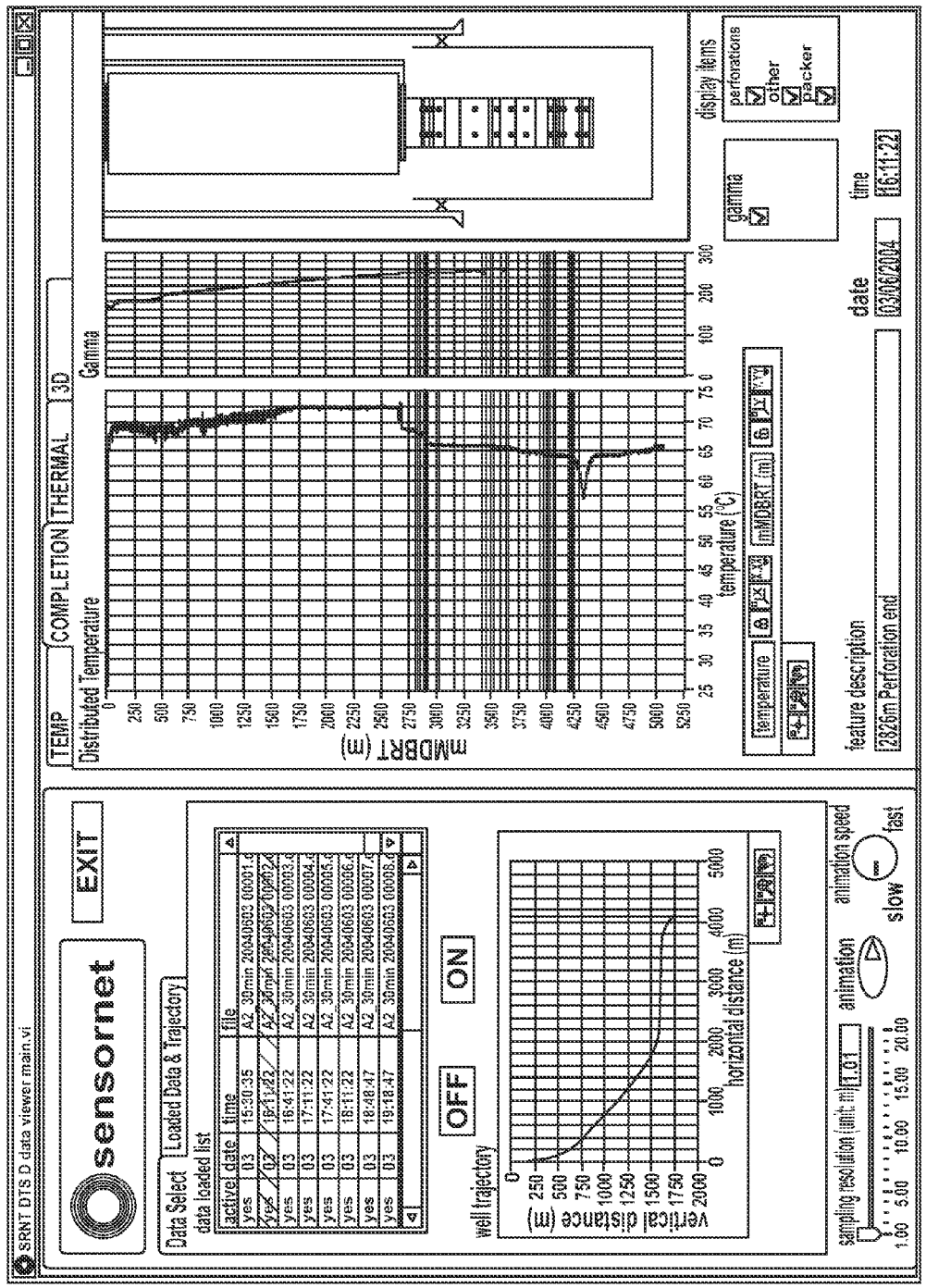

FIG. 5 shows at the left hand side a tab called "loaded data and trajectory" which has been selected. This shows a view of a trajectory of the borehole, indicating vertical and horizontal distance. This tab also shows which files of measurements have been loaded. This can be used for selecting which loaded measurements are to be displayed. The trajectory view could alternatively be shown as a three dimensional view of the bore or whatever installation the path is there to monitor, e.g. a dam, a bridge or pipeline. The well trajectory is an example of the general concept of a trajectory view which can encompass as a picture of any installation or area being monitored. For example, this could be a dam with a fibre looped along it at many different depths and heights. As the user changes the temperature view, the section of fibre whose temperature is being displayed is highlighted in the installation picture. This can be highlighted simply by displaying cursors at the extremes of the viewed portion. This trajectory could be a 3-D, user scalable and rotatable picture with the portion viewed highlighted. The trajectory view could be a representation such as a picture of any installation. For example, this could be a dam with a fibre looped along it at many different depths and heights. As the user changes the temperature view, the section of fibre whose temperature is being displayed can be highlighted in the installation picture. A simple way of highlighting is to display cursors at the extremes of the viewed portion, but this could be a 3-d, user scalable and rotatable picture with the portion viewed in the temperature or thermal or 3D view highlighted visually.

Physical features could be superimposed on this trajectory view or on a 3D view, as could conditions such as temperature, by means of shading or colour for example. The cursors in the form of vertical lines or regions, or other highlighting for example, can be manipulated by a user to control the range of distance shown in the completion view, shown in the right hand side of this figure. This right hand side shows a second of the four displays presented to a user, if the user selects the "completion" tab. In this view the temperature is displayed alongside a completion view of the bore well. There are a few special features associated with the graphs.

1. A user can click on completion picture to cause the view to be centred immediately on where the mouse was clicked. This also updates the temperature plot.
2. The completion scale and position tracks the temperature scale and position.
3. Extra graphs of other parameters can be displayed simultaneously for example when the gamma box is selected.
4. Horizontal cursors line up features from the completion view onto the graph, allowing for fast location of, for example, perforations. The display of these cursors can be toggled using the display items tick box in the lower right of FIG. 5.
5. As the user moves the mouse across the graph a textual output of the feature at that particular location is displayed at the bottom of the screen in the 'feature description' field.

The completion view can include features of the borehole represented graphically such as linings, changes in pipe diameter, perforations, and other features. This view can be presented alongside the graph of temperature and at the same scale so that changes in temperature caused by features of the borehole can be identified visually if they line up horizontally or vertically for example. Where the one dimensional path is long such as a number of kilometres, and the features of interest may be much smaller, e.g. down to a few meters or less, a large range of zoom is needed in the distance dimension. To avoid the symbols representing physical features from becoming unrecognisable by distortion when one dimension is zoomed, the symbols can be reproportioned. For example an area of perforations in the borehole to allow ingress of oil is shown by the black dots in a shaded area. Rather than allowing the dots to become long ellipses, the feature is reproportioned by increasing the number of dots as the shaded area is elongated by zooming in. Physical features such as a casing are shown schematically by vertical lines on both sides of the bore, and a pump is shown by a shaded area of intermediate diameter. Boxes labelled "display items" at the lower right hand side enable a user to select categories of physical features to be displayed, to avoid too much clutter.

The physical features (completion) representation can include a two or three dimensional view of the path if appropriate. For example, it could show the trajectory of a borehole in two or three dimensions, or the trajectory of the path through 2 D of a structure like a surface of an aircraft wing, or through three dimensions such as a path winding backwards and forwards through a bridge structure or through different levels of a dam for example, to detect strain or subsidence.

The physical features representation can include time varying information such as whether a pump or valve is off or on, and this information can be updated according to the time of the viewed measurements.

The physical features representation can include representation of more than one path. For example there may be paths along neighbouring boreholes, or there may be a number of separate paths covering a single installation such as a building, bridge or dam. Accordingly it may be useful to present representations of measurements from many paths, all with visual correlation to the physical features of the same installation. This may be particularly appropriate to show in a plan view or a three dimensional view for example, to show the relationship of the two or more paths.

The scaling and associating of the physical features representation is intended to encompass examples where the underlying data is recorded in or converted into a scale common to both representations, so that both can be rescaled for zooming easily and independently, while highlighting the visual correlation accurately. It is also intended to encompass examples where the representations are output at different scales in the sense of different zoom levels. This can still enable visual correlation even if represented at a different scale and in a different orientation, perhaps in a different window, provided there is some other suitable highlighting. This could be in the form of leadlines joining points showing the same location, or the same time, or cursor lines at notable boundaries, or by colour coding for example. Any of these can enable quicker interpretation than trying to correlate using only numerical values or using separate graphs with only numbers on axes to provide any correlation.

The program could generate warning symbols overlaid on the physical features representation or on the trajectory representation, to show where a measurement feature has occurred. Such a feature could be the measurement exceeding a threshold set by a user, or exceeding a threshold of amount or rate of change for example. The symbol could indicate the type and or severity or priority of the measurement feature. This again could enhance the ease and speed of interpretation of the measurements. Another option is to allow representations of mathematical combinations of measurements of different parameters or of the same parameters at different times or different locations to be presented. Again such representations can be scaled and associated to enable visual correlation with the physical features or with events at given times.

Figure 6:
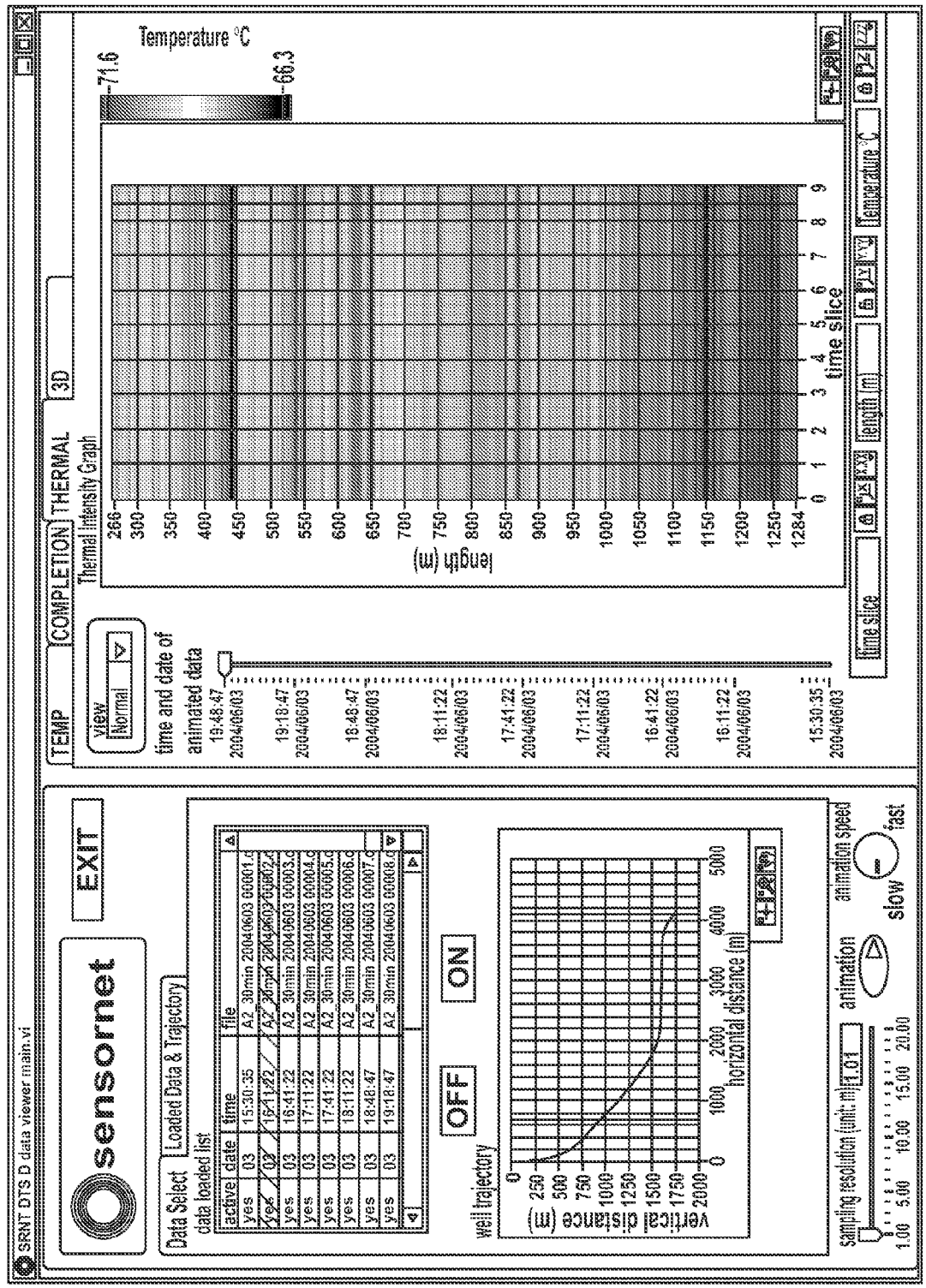
Figure 7:
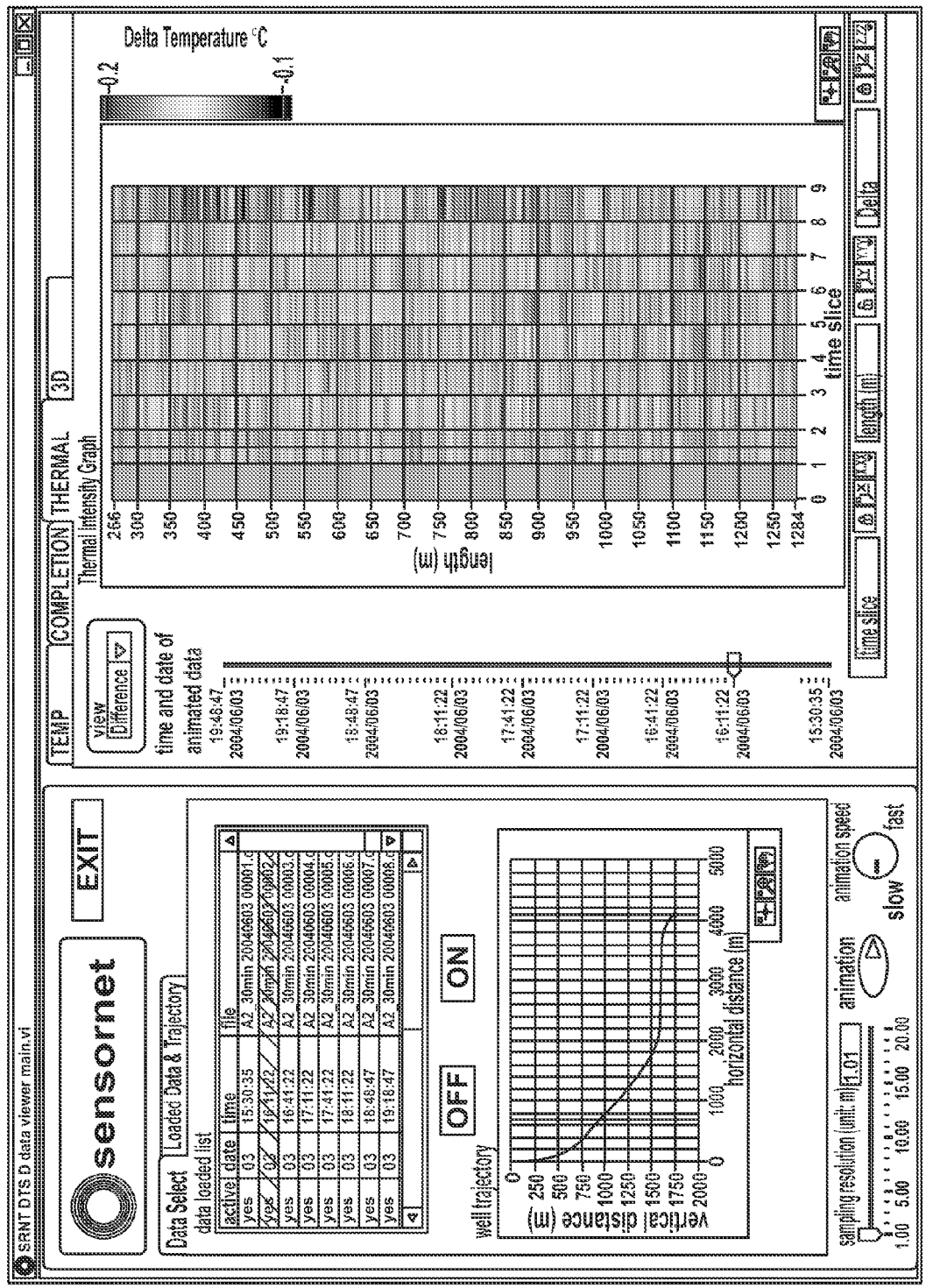
Figure 8:
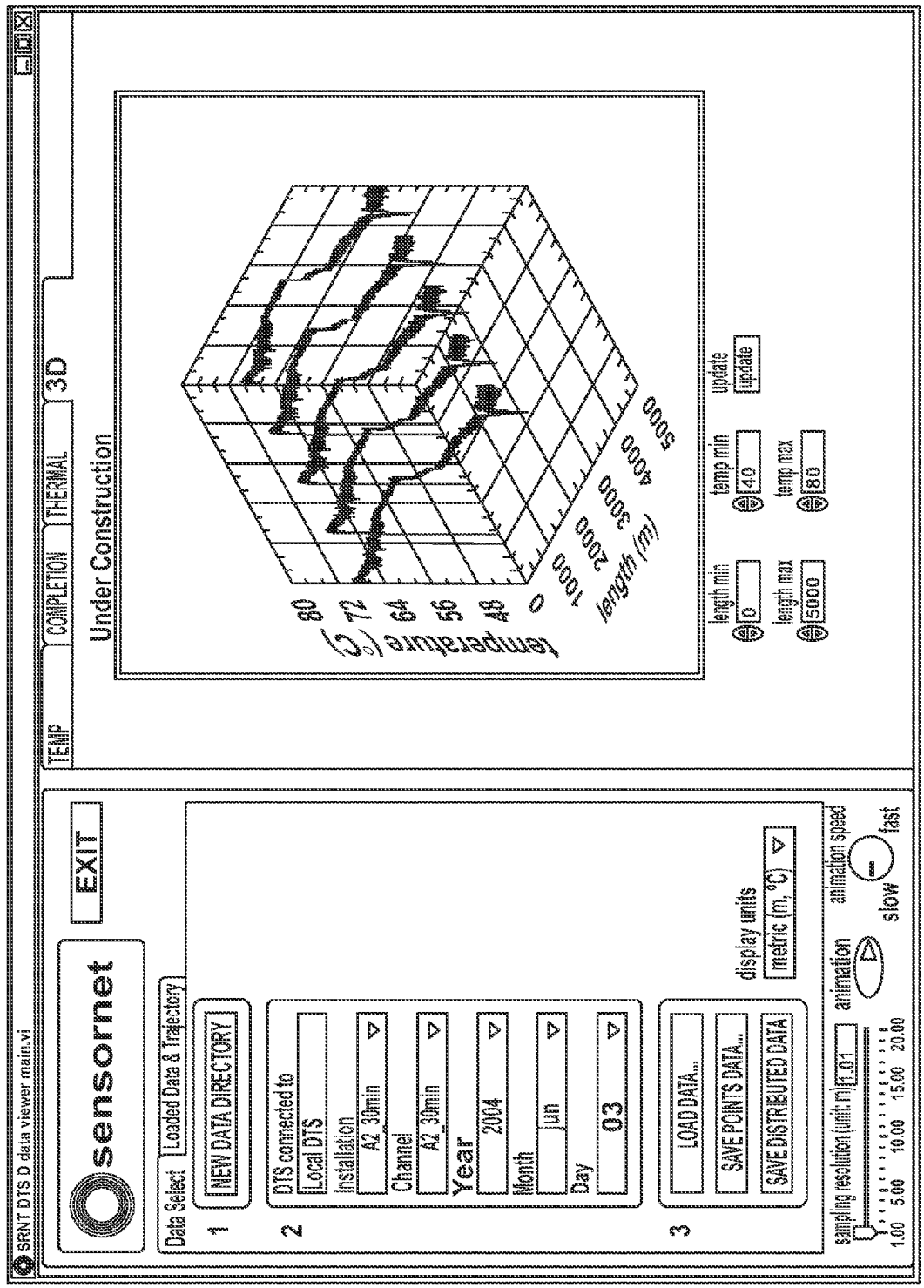

FIGS. 6, 7, 8 Thermal and 3D Views

FIGS. 6 and 7 show a view if the user selects the third of the four tabs, the "thermal" tab. Temperature slices for a range of locations represented on the vertical axis are displayed using colours or greyscales for example. They change over time represented by the horizontal axis. For the best effect it is useful to zoom into the diagram. In a colour view, red indicates the hottest temperatures in the viewed range and blue indicates the coolest temperatures in the viewed range. In the view shown, the range is between 266 m and 1284 m along the bore. Directly to the left of the temperature slices a scroll bar indicates which time slice is displayed, if there is too much information to fit onto the horizontal axis directly. A cursor line on the temperature slices corresponds to the time information indicated in the scroll bar.

There are two views available. Normal view (FIG. 6) shows the actual temperature for each time slice while the Difference view (FIG. 7) shows the temperature difference with respect to the first time slice. Hence in FIG. 7, the first column on the left is shown all in the same shade. Different shades in the other columns show how the temperature has changed. In these views there is some visual correlation of the thermal measurements by means of cursor lines drawn in colour on the trajectory view. The trajectory view gives some physical features in terms of depth and turns in the path of the bore. More physical features could be shown on this trajectory view. Although not illustrated, it is useful also in the thermal view to have the representation of the physical features (completion view) overlaid or alongside the time varying view of the measurements, to provide more detailed visual correlation. This can also enable simultaneous visual correlation of location and time of the measurements to location of physical features and time of external events.

Again not illustrated here for the sake of clarity, it is possible to represent external events on the time axis of the thermal view. Such events might include starting or stopping a pump, opening or closing a valve to start or stop a flow, starting or stopping an intervention procedure, or events in another borehole, such as starting or stopping injection of water, or pumping of oil, or drilling another bore for example. In the case of other structures, the events could include weather events such as high winds, or frosts, or other temporary extremes of loading on a bridge or building, for example.

FIG. 8 shows a view if the user selects the fourth of the four tabs, the "3D" tab. This shows similar information in a 3D format. Time and location are represented on two of the three axes, and measurement such as temperature on a third axis. Again this could enable visual correlation in time and location. Many variations can be conceived. The 3D view could be pictured as a mesh or a shaded opaque surface. Or multiple parameters could be viewed simultaneously for example.

FIG. 9 User Steps

Figure 9:
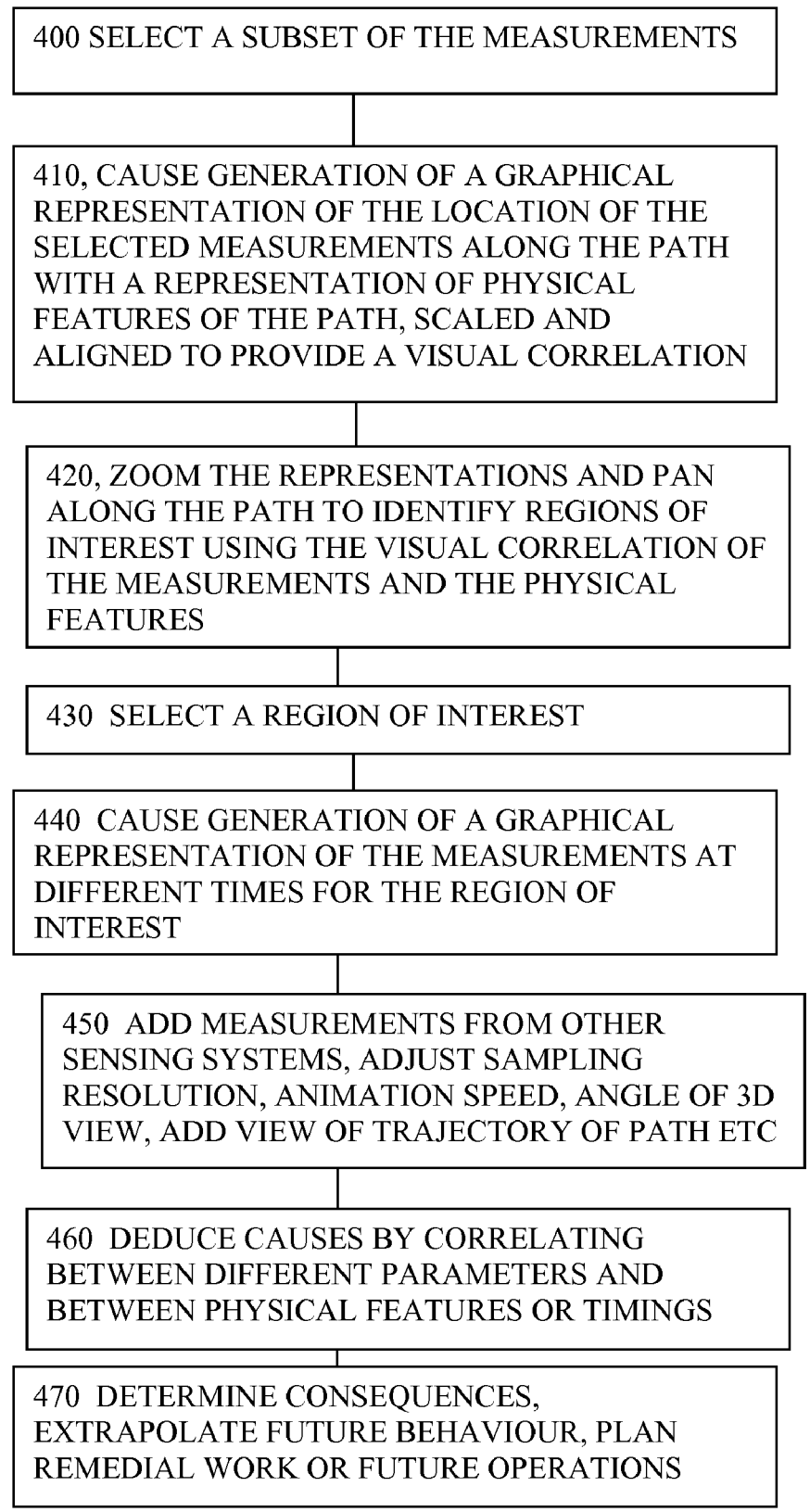
FIG. 9 shows a flow chart of some actions of a user of the program.

An example of user steps involved in using or operating the software, will now be described. There are many variations possible to suit the application. FIG. 9 shows some of the steps:

a) connect to DTS
b) select data, typically a number of files, (also step 400 of FIG. 9)
c) select time of recorded data, select trajectory view showing well trajectory in terms of depth and horizontal distance,
d) select temp tab to show window of temperature versus time for a portion of the path, and another window showing temperature vs distance.
e) move cursor along either view to select position along path,
f) view temp profile over time for the selected position
g) adjust zoom or position of windows in terms of location or temp, adjust position or zoom of window in terms of time range or temperature range.
h) move second cursor in trajectory view to give a reference graph of temperature versus time at a different location.
i) select completion tab to view temperature in relation to position of physical features (also step 410, cause generation of a graphical representation of the selected measurements with a representation of physical features of the path, to provide a visual correlation).
j) click on completion diagram to centre at point of interest, (see also step 420, zoom the representations and pan along the path to identify regions of interest using the visual correlation of the measurements and the physical features).
k) view feature description as user moves mouse over graph or completion diagram. (see step 430, select a region of interest)
l) Show or hide extra displays such as the gamma view. Show or hide cursor lines for, e.g. perforations.
m) select thermal tab to view temperature slices using colour tables. (see step 440, cause generation of a graphical representation of the measurements at different times for the region of interest).
n) adjust zoom or position of window in terms of location or temperature, adjust position or zoom of second window in terms of time range or temperature range
o) change between normal and difference view.
p) select 3D tab to view temperatures in a 3D view.

Additional options include as shown in step 450, adding views of measurements from other sensing systems, or measurements of other parameters, adjusting sampling resolution, animation speed, angle of 3d view, adding view of trajectory of path, or viewing mathematical combinations of measurements to see any visual correlations with physical features or external events etc. All these can help in different circumstances, to aid interpretation, and enable a user to deduce causes by correlating between different parameters and physical features or external events, step 460. The user can thus determine possible consequences for the installation being monitored or controlled, and extrapolate future behavior of the installation or its surroundings, and plan remedial work or future operations. In the example of an oil well, temperature measurements can enable deduction of which strata oil is coming from, or where water is entering in step 470. This can enable an operator to plan which perforations to block, which to expand and which boreholes to use to inject water to extend production life of an oilfield for example.

FIG. 10 Program

Figure 10:
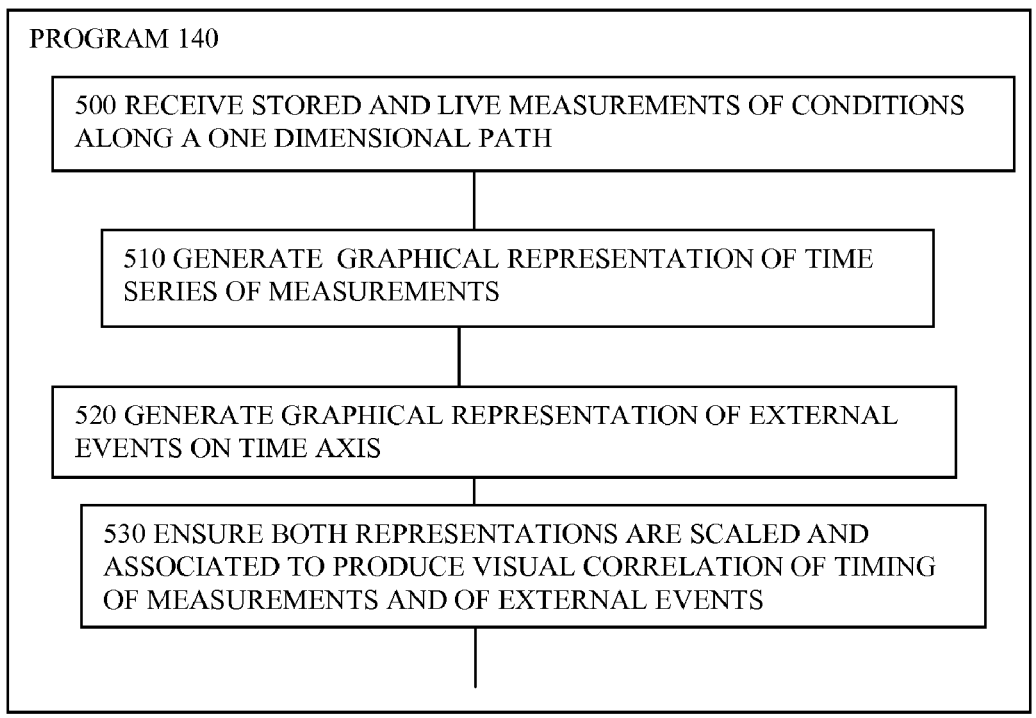
FIG. 10 shows steps of another embodiment of the program.

FIG. 10 shows another embodiment of a program, this time for providing a visual correlation between the timing of measurements and timing of external events. This can be combined with providing visual correlation of location of measurements or with any other program features or applications described above. At step 500, the measurements are received, and at step 510 a graphical representation of a time series of measurements is generated. At step 520, a graphical representation of external events on a time axis is generated. At step 530, both representations are scaled and associated to produce a visual correlation of timing of the measurements and of the external events.

Concluding Remarks

Examples of implementation of the program or programs making up the process can include program objects that can be invoked via different programmatic paradigms e.g. API (application program interface, CLI (command line interface) and others, and can be invoked on a variety of different platforms including, but not limited to, a JAVA platform, an XML platform, a COM (common object model) platform and an ODBC (open database connectivity) platform for example. Embodiments of the present invention can be implemented as a computer program product that includes a computer program mechanism embedded in a computer readable storage medium. For instance, the computer program product could contain program modules. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

They can be implemented in a WINDOWS™ MAC OS™, LINUX, or SOLARIS™ environments using well known software development tools, such as labview™.

As has been described above, software for processing measurements from a distributed sensing system receives the measurements, and generates a graphical representation of the measurements indicating their location or time sequence, and a representation of locations of physical features along the path, or times of external events. The representations are scaled and associated to provide a visual correlation between the locations of the measurements and locations of the physical features, or between times of measurements and times of external events, while enabling easy panning and zooming to find or rule out quickly small regions of interest in large volumes of measurements. The enhanced visual correlation can lead to cost savings if more rapid interpretation of large volumes of measurements can give warning of changes such as subsidence of structures, or of ingress of water into oil wells, for example in time for remedial action to be taken.

Other variations within the claims can be conceived.

The invention claimed is:

1. A computer readable medium having computer-executable instructions stored thereon that, if executed by a computer cause the computer to process measurements from a distributed sensing system for sensing conditions at any range of locations along a one dimensional path of a borehole, by a method having the steps of receiving the measurements of the conditions along the borehole, and generating a graphical representation of the measurements indicating their location, and how they vary with time, and generating a further graphical representation of physical features located at known locations along the path of the borehole, the physical features comprising borehole completion features and geological features around the borehole, so that both graphical representations are scaled and associated to provide an output view having a visual correlation between the locations of the borehole completion features or geological features around the borehole and measurements of the conditions at the same locations along the borehole, and the output view comprising a window showing a selected part of the representations at a user adjustable zoom level in terms of location and time and having a user adjustable window position in terms of location and time of measurements.

2. The medium of claim 1, arranged to receive measurements from a second sensing system, and generate a third representation scaled and associated with the representation of the physical features.

3. The medium of claim 1, the visual correlation being provided by overlaying the representations.

4. The medium of claim 1, the visual correlation being provided by having the representations offset such that axes representing distance along the path for each representation are parallel.

5. The medium of claim 1, the processing comprising a preliminary step of calibrating (310) the locations of the measurements using a reference measurement at a reference location.

6. The medium of claim 1, the processing comprising generating at least a third representation of measurements of a different parameter, scaled and aligned to the first two representations.

7. The medium of claim 1, the processing comprising generating graphical symbols for the physical features which are reproportioned as the distance scale is altered.

8. The medium of claim 1, the processing comprising generating a representation in a time axis of external events affecting the path, scaled and aligned with the representation of the measurements over time.

9. The medium of claim 1, the representation of the measurements comprising a three or more dimensional view of the conditions, at least one of the dimensions representing time or location.

10. The medium of claim 1, the processing comprising generating a graphical representation of a trajectory of the path.

11. The medium of claim 1, the processing comprising generating a representation of a region of interest in the measurements.

12. The medium of claim 11, the processing comprising marking an indication of the region on the representation of the location of the physical features.

13. A computer readable medium having computer-executable instructions stored thereon that, if executed by a computer cause the computer to process measurements from a distributed sensing system for sensing conditions at any range of locations along a one dimensional path of a borehole, by a method having the steps of receiving the measurements, and generating a graphical representation of a time series of the measurements, and generating a further graphical representation of known timings of external events relating to changes in physical features of the borehole at given locations along the path, both representations being scaled and associated to provide an output view having a visual correlation between the timing of the measurements and the external events and the output view comprising a window showing a selected part of the representations at a user adjustable zoom level in terms of location and time and having a user adjustable window position in terms of location and time of measurements.

14. A computer comprising an interface to one or more distributed sensing systems for sensing conditions at any range of locations along a one dimensional path of a borehole, the interface being arranged to receive measurements of the conditions along the borehole, and the computer having a processor for generating a graphical representation of the measurements indicating their location, and generating a further graphical representation of physical features located at known locations along the path of the borehole, the physical features comprising borehole completion features and geological features around the borehole, so that both graphical representations are-scaled and associated to provide an output view having a visual correlation between the locations of the borehole completion features or geological features around the borehole and measurements of the conditions at the same locations along the borehole, the output view comprising a window showing a selected part of the representations at a user adjustable zoom level in terms of location and time and having a user adjustable window position in terms of location and time of measurements, the computer also having a display for presenting the output view to the user, and for receiving user input.

15. A system comprising a distributed sensing system for sensing conditions remotely at substantially all locations along a one dimensional path, and further comprising a computer comprising an interface to one or more distributed sensing systems for sensing conditions at any range of locations along a one dimensional path of a borehole, the interface being arranged to receive measurements of the conditions along the borehole, and the computer having a processor for generating a graphical representation of the measurements indicating their location, and generating a further graphical representation of physical features located at known locations along the path of the borehole, the physical features comprising borehole completion features and geological features around the borehole, so that both graphical representations are-scaled and associated to provide an output view having a visual correlation between the locations of the borehole completion features or geological features around the borehole and measurements of the conditions at the same locations along the borehole, the output view comprising a window showing a selected part of the representations at a user adjustable zoom level in terms of location and time and having a user adjustable window position in terms of location and time of measurements, the computer also having a display for presenting the output view to the user, and for receiving user input.

16. A method of analysing measurements from a distributed sensing system for sensing conditions at any range of locations along a one dimensional path of a borehole, comprising the steps of selecting a subset of the measurements, generating a graphical representation of locations of the selected measurements along the path of the borehole, and generating a further graphical representation of physical features located at known locations of the path of the borehole, the physical features comprising borehole completion features and geological features around the borehole, so that the representations are scaled and associated to provide a visual correlation, zooming the representations and panning along the path to identify regions of interest using the visual correlation of the measurements and the physical features, selecting a region of interest, and causing generation of a graphical representation of the measurements at different times for the region of interest.

17. The method of claim 16, further comprising the step of selecting measurements from a second sensing system, and causing generation of a third representation scaled and associated with the representation of the physical features.

* * * * *